United States Patent
Sahnoune et al.

(10) Patent No.: US 8,202,467 B2
(45) Date of Patent: Jun. 19, 2012

(54) PROPYLENE-BASED POLYMER ARTICLE

(75) Inventors: Abdelhadi Sahnoune, Houston, TX (US); Sunny Jacob, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 812 days.

(21) Appl. No.: 11/880,843

(22) Filed: Jul. 24, 2007

(65) Prior Publication Data

US 2008/0032079 A1 Feb. 7, 2008

Related U.S. Application Data

(60) Provisional application No. 60/835,080, filed on Aug. 2, 2006.

(51) Int. Cl.
*H01J 37/30* (2006.01)
*B29C 35/08* (2006.01)
*D01D 5/24* (2006.01)

(52) U.S. Cl. ........ 264/470; 264/477; 264/485; 264/494; 264/495; 264/171.28; 264/209.1; 264/209.6; 264/211.12; 428/36.8; 522/157; 526/348; 526/348.2; 526/348.6; 526/351

(58) Field of Classification Search .................. None
See application file for complete search history.

(56) References Cited

U.S. PATENT DOCUMENTS

| | | | |
|---|---|---|---|
| 4,540,753 A | 9/1985 | Cozewith et al. | |
| 6,342,565 B1 | 1/2002 | Cheng et al. | |
| 6,500,563 B1 | 12/2002 | Datta et al. | 428/521 |
| 6,525,157 B2 | 2/2003 | Cozewith et al. | |
| 6,599,262 B1 | 7/2003 | Masini | |
| 6,642,316 B1 | 11/2003 | Datta et al. | 525/240 |
| 6,647,719 B2 | 11/2003 | Truninger | |
| 6,770,713 B2 | 8/2004 | Hanke et al. | |
| 6,881,800 B2 | 4/2005 | Friedersdorf | |
| 6,884,850 B2 | 4/2005 | Schauder et al. | |
| 6,939,918 B2 * | 9/2005 | Ellul et al. | 525/191 |
| 7,294,675 B2 * | 11/2007 | Hoyweghen et al. | 525/191 |
| 2002/0004575 A1 | 1/2002 | Cozewith et al. | 526/348 |
| 2004/0236042 A1 | 11/2004 | Datta et al. | |
| 2005/0107529 A1 * | 5/2005 | Datta et al. | 525/70 |
| 2005/0107530 A1 * | 5/2005 | Datta et al. | 525/70 |
| 2005/0131142 A1 * | 6/2005 | Datta et al. | 525/71 |
| 2005/0215964 A1 | 9/2005 | Autran et al. | |

FOREIGN PATENT DOCUMENTS

| | | |
|---|---|---|
| EP | 0 374 695 | 6/1990 |
| EP | 0 946 640 | 10/1999 |
| EP | 0 969 043 | 1/2000 |
| EP | 1 003 814 | 5/2000 |
| EP | 1 017 729 | 7/2000 |
| EP | 1 070 087 | 1/2001 |
| EP | 1 614 699 | 1/2006 |
| WO | WO 98/31283 | 7/1998 |
| WO | WO 00/01766 | 1/2000 |
| WO | WO 00/69963 | 11/2000 |
| WO | WO 02/34795 | 5/2002 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/014988 | 2/2004 |
| WO | WO 2005/049672 | 6/2005 |
| WO | WO 2006/020309 | 2/2006 |

OTHER PUBLICATIONS

G. Ver Strate et al., "Near Monodisperse Ethylene-Propylene Copolymers by Direct Ziegler-Natta Polymerization. Preparation, Characterization, Properties", Macromolecules, vol. 21, 1988, pp. 3360-3371.

R. Chowdhury et al., "Electron Beam Irradiation of Ethylene propylene Terpolymer: Evaluation of Trimethylol Propane Trimethacrylate as a Crosslink Promoter," Journal of Applied Polymer Science, vol. 97, pp. 968-975 (2005).

* cited by examiner

*Primary Examiner* — Jeffrey Wollschlager

(74) *Attorney, Agent, or Firm* — Stephen Timmins; Hsin Lin; Kevin M. Faulkner

(57) ABSTRACT

A method for extruding transparent and/or translucent article is provided. In one embodiment, the method comprises providing a propylene-based polymer comprising propylene derived units and one or more dienes, the propylene-based polymer having a triad tacticity of from 50% to 99% and a heat of fusion of less than 80 J/g, extruding the propylene-based polymer in the absence of processing oil into an article; and then crosslinking the extruded article.

18 Claims, No Drawings

PROPYLENE-BASED POLYMER ARTICLE

CROSS REFERENCE TO RELATED APPLICATION

This application claims the benefit of Provisional Application No. 60/835,080, filed Aug. 2, 2006, the disclosure of which is incorporated by reference in its entirety.

FIELD OF INVENTION

Embodiments of the present invention relate to transparent and/or translucent, extruded articles and methods for making same. More particularly, embodiments of the present invention relate to transparent and/or translucent, extruded tubing produced from low viscosity, crosslinked propylene-diene based polymers.

BACKGROUND

A variety of transparent and/or translucent thermoplastic compositions have been developed. Each of those compositions has a particular level of transparency, often characterized in terms of haze, which is expressed as a percentage (%) in accordance with recognized test procedures. However, thermoplastic compositions sometimes exhibit unsatisfactory high haze values (low transparency), poor processability and poor mechanical properties, including undue hardness, low flexibility, etc. For example, previously-proposed thermoplastic elastomer compositions with transparency and flexibility such as compounds based on styrene-ethylene-butadiene-styrene block copolymers, thermoplastic vulcanizate blends (TPV) or thermoplastic olefin (TPO) blends have reached transparency and softness levels that are unsatisfactory in certain applications.

U.S. Pat. No. 6,500,563, for example, discloses blends of two different types of polypropylene, including blends made from a polypropylene having a melting point (Tm) of less than 110° C. and propylene-ethylene copolymer that has isotactically-arranged propylene-derived sequences and Tm less than 105° C.

Three component blends of isotactic polypropylene, impact modifying amounts of an ethylene-propylene-based rubber or low-density ethylene copolymer and a propylene-based elastomer as compatibilizer are described in EP946640, EP964641, EP969043 and EP1098934.

WO04/014988 describes blends of isotactic polypropylene with non-functionalized plasticizers such as poly-alpha-olefins. WO03/040233 also discloses two component blends with the isotactic polypropylene as the predominant, matrix phase and the propylene-based copolymer serving as an impact modifier.

EP1003814 and U.S. Pat. No. 6,642,316 disclose two-component blends of small amounts of isotactic polypropylene and predominant amounts of an ethylene based elastomer. EP0374695 discloses visually homogeneous two component blends however using 40 wt % or less of the propylene-based copolymer. WO 00/69963 describes films made of two-component blends with from 75 to 98 wt % of a propylene ethylene based elastomer having a heat of fusion of less than 25 J/g.

However, such thermoplastic and thermoplastic elastomer compositions are typically prepared with one or more processing aids and/or oils to provide the necessary processability properties for extrusion. Such processing aids and oils over time tend to seep or "bleed out" into the conveyed fluid(s), and contaminate those fluids. As such, tubing used for food contact and medical applications can tolerate very little, if any, bleed. Otherwise, the tubing is not suitable for food contact and medical applications.

There is a need, therefore, for a thermoplastic composition that has a desirable balance of softness, flexibility and strength, and which can be easily processed in a molten state in extrusion or molding without the presence of processing aids and/or oils.

SUMMARY OF THE INVENTION

A method for extruding transparent and/or translucent tubing is provided. In one embodiment, the method comprises providing a propylene-based polymer comprising propylene derived units and one or more dienes. The propylene-based polymer has a triad tacticity of from 50% to 99% and a heat of fusion of less than 80 J/g. The propylene-based polymer is extruded in the absence of processing oil into an article, and then the extruded article is crosslinked.

In at least one other embodiment, the method comprises blending a propylene-based polymer comprising propylene derived units and one or more dienes and one or more polyolefinic thermoplastic components to provide a blend. The propylene-based polymer has a triad tacticity of from 50% to 99% and a heat of fusion of less than 80 J/g. The blend contains no processing oil. The blend is extruded into tubing and crosslinked.

Furthermore, a tube is provided. In at least one embodiment, the tube comprises a propylene-based polymer comprising propylene derived units and one or more dienes and optionally one or more polyolefinic thermoplastic components. The propylene-based polymer has a triad tacticity of from 50% to 99% and a heat of fusion of less than 80 J/g. The tube comprises substantially no processing oil.

DETAILED DESCRIPTION OF INVENTION

Transparent and/or translucent, extruded articles from a thermoplastic composition, and methods for making the same are disclosed. Surprisingly, the thermoplastic composition can be extruded using conventional extrusion techniques and can be prepared without the use of plasticizers and/or processing aids. Such plasticizer-free articles can be used in medical and food contact applications. In one or more embodiments, the thermoplastic composition includes a propylene-based polymer. In one or more embodiments, the thermoplastic composition includes a propylene-based polymer blended with one or more other polyolefinic thermoplastic resins. Preferably, the thermoplastic compositions described are extruded into tubing for use in medical and food contact applications.

Propylene-Based Polymer

The propylene-based polymer can be propylene-α-olefin-diene terpolymers or propylene-diene copolymers. For simplicity and ease of description, however, the term "propylene-based polymer" as used herein will refer to both propylene-α-olefin-diene terpolymers and propylene-diene copolymers.

The propylene-based polymer can be prepared by polymerizing propylene with one or more comonomers. In at least one specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP1070087. The catalyst described in EP1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene-based polymer can have a density of about 0.85 g/cm$^3$ to about 0.92 g/cm$^3$, more preferably, about 0.87 g/cm$^3$ to 0.90 g/cm³, more preferably about 0.88 g/cm³ to about 0.89 g/cm³ at room temperature as measured per the ASTM D-1505 test method.

In one or more embodiments above or elsewhere herein, the propylene-based polymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min or more especially 10 g/10 min to about 25 g/10 mm.

The propylene-based polymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≦ about 80 J/g, preferably ≦about 75 J/g, preferably ≦about 70 J/g, more preferably ≦about 60 J/g, more preferably ≦about 50 J/g, more preferably ≦about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning Calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning Calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}C$ NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 20040236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1 614 699 or EP 1 017 729.

Grafted (Functionalized) Backbone

In one or more embodiments, the propylene-based polymer can be grafted (i.e. "functionalized") using one or more grafting monomers. As used herein, the term "grafting" denotes covalent bonding of the grafting monomer to a polymer chain of the propylene-based polymer.

Preferably, the grafting monomer is at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt. %, preferably at least about 0.5 wt. % and highly preferably about 1.5 wt. %. Suitable embodiments of such grafted polymers and methods for making them are described in U.S. Pat. No. 6,884,850, incorporated by reference.

Styrene and derivatives thereof such as paramethyl styrene, or other higher alkyl substituted styrenes such as t-butyl styrene can be used as a charge transfer agent in presence of the grafting monomer to inhibit chain scissioning. This allows further minimization of the beta scission reaction and the production of a higher molecular weight grafted polymer (MFR=1.5).

Polyolefinic Thermoplastic Resin

The term "polyolefinic thermoplastic resin" as used herein refers to any material that is not a "rubber" and that is a polymer or polymer blend having a melting point of 100° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non cross-linked.

In one or more embodiments, the polyolefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of 25 to 30 g/10 min. Others have a lower MFR, e.g., "fractional" polypropylenes which have an MFR less than 1.0. Those with high MFR can be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a single phase mer of propylene having up to 9 wt %, preferably 2 wt % to 8 wt % of an alpha olefin mer. Preferred alpha olefin comonomers have 2 carbon atoms, or from 4 to 12 atoms. Preferably, the alpha olefin comonomer is ethylene.

Blending and Additives

In one or more embodiments, the individual materials and components, such as the propylene-based polymer and optionally the one or more polyolefinic thermoplastic resins, can be blended by melt-mixing to form a blend that contains no processing oil. In other words, the blend is processed in the absence of processing oil. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM).

In one or more embodiments, the blend can include the propylene-based polymer in an amount ranging from a low of about 60, 70 or 75 wt % to a high of about 80, 90, 95 wt %. In one or more embodiments, the blend can include the one or more polyolefinic thermoplastic components in an amount ranging from a low of about 5, 10 or 20 wt % to a high of about 25, 30, 75 wt %.

When the one or more polyolefinic thermoplastic resins are present, the blend can include about 60 wt % to about 95 wt % of the propylene-based polymer and about 5 wt % to about 40 wt % of the one or more polyolefinic thermoplastic resins. In one or more embodiments, the blend can include about 70 wt % to about 95 wt % of the propylene-based polymer and about 5 wt % to about 30 wt % of the one or more polyolefinic thermoplastic resins. In one or more embodiments, the blend can include about 65 wt % to about 80 wt % of the propylene-based polymer and about 20 wt % to about 35 wt % of the one or more polyolefinic thermoplastic resins.

EP and EPDM

In one or more embodiments of the present invention, the propylene-based polymer may optionally be further blended with an ethylene-propylene copolymer or an ethylene-propylene-diene terpolymer (commonly referred to as "EP" and "EPDM", respectively).

Preferably, the ethylene-propylene polymer (EP) is non-crystalline, e.g., atactic or amorphous, but in certain embodiments the EP may be crystalline (including "semi-crystalline"). But any crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

Preferably, the EP includes (or is) an elastomeric polymer, which is preferably an ethylene-propylene elastomer having high molecular weight (as measured by Mooney Viscosity) and low crystallinity. The EP can be prepared utilizing any appropriate catalyst.

Furthermore, the EP can include one or more optional polyenes, including particularly a diene; thus, the EP can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of the optional polyene include, but are not limited to butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Me) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyl-tetrahydroindene; dicyclopentadiene; bicyclo-(2.2.1)-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

In one or more embodiments of the present invention, in addition to the propylene-based polymer and (if present) one or more polyolefinic thermoplastic resins, the blends may include from about 0 wt % to about 25 wt % EP and/or EPDM. In further embodiments, the blends may comprise from about 2 wt % to about 20 wt % EP and/or EPDM. Further, the blends may comprise from about 5 wt % to about 15 wt % EP and/or EPDM.

Co-Agents

In one or more embodiments, the propylene-based polymer may also be blended with one or more co-agents. As used herein, a "co-agent" is any bi-functional or multi-functional compound containing more than one double bond. Co-agents are typically, but not exclusively, small molecules, and generally do not include those compositions considered to be polymers by persons having skill in the art. In some embodiments, co-agents may include liquid and/or metallic multi-functional acrylate and methacrylate crosslinking agents (such as, for example, the Saret and SR families of agents available from Sartomer Company), functionalized polybutadiene resins (such as, for example, Ricon and Krasol LB resins available from Sartomer Company), triallyl cyanurate (TAC), and/or isocyanurate.

In one or more embodiments of the present invention, in addition to the propylene-based polymer and (if present) one or more polyolefinic thermoplastic resins and/or EP and/or EPDM, the blends may include from about 0 wt % to about 15 wt % of one or more co-agents. In further embodiments, the blends may comprise from about 0.05 wt % to about 12 wt % of one or more co-agents. Further, the blends may comprise from about 0.1 wt % to about 10 wt % of one or more co-agents.

Additives

In one or more embodiments, the blend can contain additives, which can be introduced at the same time as the other components or later downstream in case of using an extruder or Buss kneader or only later in time. Examples of such additives are antioxidants, antiblocking agents, antistatic agents, ultraviolet stabilizers, foaming agents, and processing aids. Such additives can include of from about 0.1 to about 10 percent by weight based on the total weight of blend. The additives can be added to the blend in pure form or in master batches.

Articles

The thermoplastic compositions described are useful for making articles by extrusion, injection molding, blow molding, calendaring and compression molding techniques. Particularly, the thermoplastic compositions are useful for making a variety of articles for medical, food and consumer applications. Some specific articles include, but are not limited to, films, tubing, hoses, moldings, and molded parts, for example. Preferably, the compositions described are used for extruded tubing for food contact and medical applications including feeding tubes, breathing tubes and IV tubes.

In one or more embodiments, the extruded tube has an inner diameter (d) of about 0.1 cm, or about 0.2 cm, or about 0.5 cm, or about 0.7 cm, or about 1.0 cm. In one or more embodiments, the extruded tube has an inner diameter ranging from about 0.2 cm to about 1 cm, or about 0.2 cm to about 0.7 cm, or about 0.2 cm to about 0.5 cm. In one or more embodiments, the inner diameter (d) is about 0.2 cm to about 1.0 cm.

In one or more embodiments, the extruded tube has a wall thickness of about 0.25 cm, or about 0.2 cm, or about 0.15 cm, or about 0.1 cm, or about 0.05 cm. In one or more embodiments, the extruded tube has a wall thickness ranging from about 0.05 cm to about 0.25 cm, or about 0.05 cm to about 0.2 cm, or about 0.1 cm to about 0.15 cm. In one or more embodiments, the wall thickness is about 0.05 cm to about 0.25 cm.

In one or more embodiments, the extruded tube has a length (L) of at least 1 cm, or at least 10 cm, or at least 100 cm, or at least 1 m, or at least 5 m, or at least 10 m, or at least 30 m, or at least 100 m, or at least 1,000 m. In one or more embodiments, the extruded tube has a length to diameter ratio (L/d) of at least 2:1 or at least 5:1 or at least 10:1 or at least 15:1 or at least 20:1 or at least 50:1 or at least 100:1 or at least 250:1 at least 500:1 or at least 1,000:1 or at least 10,000:1

Physical Properties of Formed Articles

In one or more embodiments, the propylene-based polymer and/or blend has a haze value of about 50% or less, about 40% or less, about 30% or less, or about 20% or less.

In one or more embodiments, the propylene-based polymer and/or blend has a Shore A hardness of less than about 90. In one or more embodiments, the propylene-based polymer and/or blend has a Shore A hardness of about 45 to about 90. In one or more embodiments, the propylene-based polymer and/or blend has a Shore A hardness of about 55 to about 80. In one or more embodiments, the propylene-based polymer and/or blend has a Shore A hardness of about 65 to about 80. In one or more embodiments, the propylene-based polymer and/or blend has a Shore A hardness of about 65 to about 75. Preferably, Shore A hardness is measured according to ISO 868-85.

Cured Products

Preferably, the formed article (e.g., extruded article) is at least partially crosslinked or cured, preferably so that the article becomes heat-resistant. As used herein, the term "heat-resistant" refers to the ability of a polymer composition or an article formed from a polymer composition to pass the high temperature heat-setting and dyeing tests described herein. As used herein, the terms "cured," "crosslinked," "at least partially cured," and "at least partially crosslinked" refer to a composition having at least 2 wt % insolubles based on the total weight of the composition and/or a composition having a viscosity ratio of from 1 to 10. In one or more embodiments, the compositions described herein can be cured to a degree so as to provide at least 3 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles. In one or more embodiments, the cured composition can have a viscosity ratio of from 1 to 9, or from 1.2 to 10.

The crosslinking can be carried out on-line (i.e. during extrusion of the article) or off-line (i.e., before or after extrusion into an article). In a particular embodiment, the crosslinking is accomplished by irradiation after shaping or extruding the article. For example the shaped article can be exposed to one or more of electron-beam irradiation, beta irradiation, X-rays, gamma irradiation, controlled thermal heating, and corona irradiation.

In another embodiment, crosslinking is accomplished by exposure to one or more chemical agents. Illustrative chemical agents include but are not limited to peroxides and other free radical generating agents, sulfur compounds, phenolic resins, silicon hydrides and hydrosilation procedures. In a particular aspect of this embodiment, the crosslinking agent is either a fluid or is converted to a fluid such that it can be applied uniformly to the article. Fluid crosslinking agents include those compounds which are gases (e.g., sulfur dichloride), liquids (e.g., Trigonox C, available from Akzo Nobel), solutions (e.g., dicumyl peroxide in acetone, or suspensions thereof (e.g., a suspension or emulsion of dicumyl peroxide in water).

Illustrative peroxides include, but are not limited to dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate. Illustrative radical generating agents include, but are not limited to azo compounds. Peroxide and free radical generating curing systems are usually accompanied by the addition of coagents which may enhance the effectiveness of the crosslinking. Examples of such coagents include, but are not limited to polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, azobis isobutyl nitrite and the like, and combinations thereof.

In one or more embodiments, the crosslinking can be carried out under an inert or oxygen-limited atmosphere. Suitable atmospheres can be provided by the use of helium, argon, nitrogen, carbon dioxide, xenon and/or a vacuum.

Irradiation crosslinking can be conducted with gamma rays, electron beam, UV rays or other sufficiently high energy radiation. Suitable electron-beam equipment is available from E-BEAM Services, Inc., Cranbury, N.J. with capabilities of at least 100 kilo-electron volts (KeV) and at least 5 kilowatts (Kw). In a particular embodiment, electrons are employed in up to 70 megarads dosages. The source can be any electron beam generator operating in a range of about 150 Kev to about 12 mega-electron volts (MeV) with a power output capable of supplying the desired dosage. The electron voltage can be adjusted to appropriate levels which may be, for example, 100,000; 300,000; 1,000,000; 2,000,000; 3,000,000; 6,000,000. A wide range of apparatus for irradiating polymers and polymeric articles is available.

Effective irradiation is generally carried out at a dosage between about 1 megarads (Mrad) to about 35 megarads, preferably from about 2 to about 35 megarads, or from about 3 to about 25 megarads, or from about 4 to about 20 megarads. In a particular aspect of this embodiment, the irradiation is carried out at room temperature.

Crosslinking either by chemical agents or by irradiation can be promoted with a crosslinking catalyst, such as organic bases, carboxylic acids, and organometallic compounds including organic titanates and complexes or carboxylates of lead, cobalt, iron, nickel, zinc, and tin (such as dibutyltindilaurate, dioctyltinmaleate, dibutyltindiacetate, dibutyltindioctoate, stannous acetate, stannous octoate, lead naphthenate, zinc caprylate, cobalt naphthenate, and the like).

EXAMPLES

The foregoing discussion can be further described with reference to the following non-limiting examples. Propylene copolymers (designated as "PCP-xx" or "PCP-xxxx") in accordance with one or more embodiments were prepared. Those copolymers were used to prepare polymer examples according to the formulations shown in Table 1.

TABLE 1

Formulations in weight percent

| | Example: | | | | |
|---|---|---|---|---|---|
| | 1 | 2 | 3 | 4 | 5 |
| PCP-01 | 100 | | | | |
| PCP-04 | | 100 | 85 | | |
| PCP-05 | | | | 100 | |
| PCP-17 | | | | | 100 |
| PP 3155 | | | 14.9 | | |
| Irgafos ™ 168 | | | 0.1 | | |

| | Example: | | | | | | | | | |
|---|---|---|---|---|---|---|---|---|---|---|
| | 6 | 7 | 8 | 9 | 10 | 11 | 12 | 13 | 14 | 15 | 16 |
| PCP-1027 | 100 | | | | | | | | | | |
| PCP-1028 | | 100 | | | | | | | 95 | | |
| PCP-1030 | | | 100 | | | | | | | | |
| PCP-1031 | | | | 100 | | | | 95 | | 90 | 85 |
| PCP-1032 | | | | | 100 | | | | | | |
| PCP-1033 | | | | | | 100 | | | | | |
| PCP-1034 | | | | | | | 100 | | | | |
| PP 5341 | | | | | | | | 5 | 5 | 10 | 15 |

| | Example: | | | | | | | | | | |
|---|---|---|---|---|---|---|---|---|---|---|---|
| | 17 | 18 | 19 | 20 | 21 | 22 | 23 | 24 | 25 | 26 | 27 |
| PCP-1031 | 89 | 88.5 | 89 | 80 | 80 | 90 | 80 | | | | |
| PCP-1032 | | | | | | | | 90 | | | |
| PCP-1033 | | | | | | | | | 98 | | |
| PCP-1034 | | | | | | | | | | 90 | |
| VM 6100 | | | | | | | | | | | 79 |
| V 878 | | | | 10 | | | | | | | |
| V 3708 | | | | | 10 | | | | | | |
| Exact 5101 | | | | | | 15 | | | 2 | | 14 |
| PP 1043N | | | | | | | 10 | | | | |
| PP 5341 | 9 | 8.5 | 9 | 10 | 10 | | 5 | 10 | | 10 | 5 |
| PLB 6941 (TAC) | 2 | 3 | | | | | | | | | 2 |
| Ricon 153 | | | 2 | | | | | | | | |

| | Example: | | | | | | |
|---|---|---|---|---|---|---|---|
| | 28 | 29 | 30 | 31 | 32 | 33 | 34 |
| PCP - 1031 | 95 | 92 | 90 | 88 | 90 | 94.8 | 94.8 |
| PP 5341 | 5 | 5 | 5 | 5 | 5 | 5 | 5 |
| TAC | | 3 | 5 | 7 | | | |
| Sartomer 350 | | | | | 5 | | |
| Irganox B225 | | | | | | 0.2 | |
| Irganox 1035 | | | | | | | 0.1 |
| Irgafos 126 | | | | | | | 0.1 |

| | Example: | | | | | | | |
|---|---|---|---|---|---|---|---|---|
| | 35 | 36 | 37 | 38 | 39 | 40 | 41 | 42 |
| PCP-1031 | 94.8 | 94.8 | 89.8 | 95 | 89.8 | 89.8 | | 90 |
| PP 5341 | 5 | 5 | 5 | | | | 5 | |
| PP 9632E1 | | | | 5 | 5 | 5 | 5 | 10 |
| TAC | | | 5 | | 5 | 5 | 5 | |
| Irgastab FS 410 | 0.2 | | 0.2 | | 0.2 | | | |
| Irgafos 168 | | 0.2 | | | | 0.2 | 0.2 | |
| VM 6102 | | | | | | | 89.8 | |

PCP-01 was a propylene-based terpolymer having 16.3 wt % of ethylene and 2.0 wt % ENB, the remainder was propylene. The melting point was 48° C. The Mooney viscosity (ML (1+4) at 125° C.) was 17.2 as measured according to a method based on ASTM D 1646. The MFR (230° C., 2.16 kg) was 3.6 g/10 min.

PCP-04 was a propylene-based terpolymer having 13.4 wt % of ethylene and 2.0 wt % ENB, the remainder was propylene. The melting point was 59° C. The Mooney viscosity (ML (1+4) at 125° C.) was 17.8 MU as measured according a method based on ASTM D 1646. The MFR (230° C., 2.16 kg) was 3.8 g/10 min.

PCP-05 was a propylene-based terpolymer having 10.3 wt % of ethylene and 2.1 wt % ENB, the remainder was propylene. The melting point was 68° C. The Mooney viscosity (ML (1+4) at 125° C.) was 18.2 as measured according to a method based on ASTM D 1646. The MFR (230° C., 2.16 kg) was 4.1 g/10 min.

PCP-17 was a propylene-based terpolymer having 11.5 wt % of ethylene and 3.8 wt % ENB, the remainder was propylene. The Mooney viscosity (ML (1+4) at 125° C.) was 18.7 as measured according to a method based on ASTM D 1646. The MFR (230° C., 2.16 kg) was 1.9 g/10 min.

PCP-1027 was a propylene-based terpolymer having 11.8 wt % of ethylene and 2.4 wt % ENB, the remainder was propylene. The Mooney viscosity (ML (1+4) at 125° C.) was 6.1 as measured according to a method based on ASTM D 1646. The MFR (230° C., 2.16 kg) was 21.7 g/10 min.

PCP-1028 was a propylene-based terpolymer having 18 wt % of ethylene and 2.6 wt % ENB, the remainder was propylene. The MFR (230° C., 2.16 kg) was 15.5 g/10 min.

PCP-1030 was a propylene-based terpolymer having 11.3 wt % of ethylene and 2.5 wt % ENB, the remainder was propylene. The Mooney viscosity (ML (1+4) at 125° C.) was 15.8 as measured according to a method based on ASTM D 1646. The MFR (230° C., 2.16 kg) was 3.1 g/10 min.

PCP-1031 was a propylene-based terpolymer having 16.1 wt % of ethylene and 2.4 wt % ENB, the remainder was propylene. The Mooney viscosity (ML (1+4) at 125° C.) was 17.5 as measured according to a method based on ASTM D 1646. The MFR (230° C., 2.16 kg) was 3.5 g/10 min.

PCP-1032 was a propylene-based terpolymer having 18.5 wt % of ethylene and 2.4 wt % ENB, the remainder was propylene. The Mooney viscosity (ML (1+4) at 125° C.) was 16.8 as measured according to a method based on ASTM D 1646. The MFR (230° C., 2.16 kg) was 3.5 g/10 min.

PCP-1033 was a propylene-based terpolymer having 12 wt % of ethylene and 2.4 wt % ENB, the remainder was propylene. The Mooney viscosity (ML (1+4) at 125° C.) was 27.0 as measured according to a method based on ASTM D 1646. The MFR (230° C., 2.16 kg) was 0.44 g/10 min.

PCP-1034 was a propylene-based terpolymer having 15.7 wt % of ethylene and 2.5 wt % ENB, the remainder was propylene. The Mooney viscosity (ML (1+4) at 125° C.) was 26.3 as measured according to a method based on ASTM D 1646. The MFR (230° C., 2.16 kg) was 0.32 g/10 min.

PP 3155 is a 36 MFR isotactic polypropylene (iPP) that is commercially available from Exxon Mobil Chemical Company.

PP 5341 0.8 MFR isotactic polypropylene (iPP) that is commercially available from Exxon Mobil Chemical Company.

PP 1043N is high crystallinity 5MFR isotactic polypropylene (iPP) that is commercially available from Exxon Mobil Chemical Company.

PP 9632E1 is 2 MFR random copolymer of polypropylene (RPP) that is commercially available from Exxon Mobil Chemical Company.

VM 6100 is a 3 MFR propylene copolymer that is commercially available from Exxon Mobil Chemical Company.

VM 6102 is a 3 MFR propylene copolymer that is commercially available from Exxon Mobil Chemical Company.

Exact 5101 is an ethylene copolymer that is commercially available from Exxon Mobil Chemical Company.

TAC is triallylcyanurate commercially available from Sartomer Company under the trade name Sartomer 507.

PLB 6941 is a master batch of TAC commercially available from Flo Polymers.

Sartomer 350 is a coagent commercially available from Sartomer Company. V878 is EPM elastomer commercially available from Exxon Mobil Chemical Company.

V3708 is EPDM elastomer commercially available from Exxon Mobil Chemical Company.

Irganox B225, Irganox 1035, Irgafos 126, Irgastab FS 410, and Irgafos 168 are commercial antidegradants commercially available from Ciba-Geigy.

Ricon 153 is a low molecular weight polybutadiene resin available commercially from Sartomer Company.

Polymerization was conducted in a 27 liter continuous flow stirred tank reactor equipped with dual pitched blade turbine agitators, 83 kg of dry hexane, 24 kg of propylene, 1.5 to 2.0 kg of ethylene, and 0.6 to 1.4 kg of 5-ethylidene-2-norbornene (ENB) were added per hour. The reactor was agitated at 700 rpm during the course of the reaction and was maintained liquid full at about 1600 psi pressure (gauge) so that all regions in the polymerization zone had the same composition during the entire course of the polymerization.

A catalyst solution in toluene of about 1.6 milligrams of dimethylsilylindenyl dimethyl hafnium and about 2.4 milligrams of dimethylanilinium tetrakis (heptafluoronaphthyl) borate was added at a rate of 6.35 mL/min to initiate the polymerization. An additional solution of tri-n-octyl aluminum (TNOA) was added to remove extraneous moisture during the polymerization. The polymerization was conducted at 58° C. to 70° C. in an adiabatic reactor. The feed was cooled to between −3° C. to 3° C. The polymerization was efficient and led to the formation of about 7.7 to 8.8 kg of polymer per hour.

Table A-1 summarizes the polymerization conditions. As shown, the catalyst feed in ranged from 5 to $17.32 \times 10^{-4}$ mol/L of the catalysts in toluene, and the activator feed ranged from 4.9 to $9.3 \times 10^{-4}$ mol/L of the activator in toluene. Both feeds were introduced into the polymerization reactor after an initial premixing for about 60 seconds at the rates indicated.

The polymers were recovered by three stage removal of the solvent, first by removing about 70% of the solvent using a lower critical solution process as described in WO0234795A1, and then removing the remaining solvent in a flash pot followed by further devolatilization in a LIST devolatization extruder. The polymers were recovered as pellets. The polymers analysis results are shown in Table A-2.

TABLE A-1

| | Polymerization conditions: | | | | | | |
|---|---|---|---|---|---|---|---|
| Polymers | Ethylene Feed (kg/hr) | Propylene Feed (kg/hr) | ENB (kg/hr) | Catalyst Conc. (×10−4 mol/L) | Activator Conc. (×10−4 mol/L) | Hexane feed (kg/hr) | Reactor Temperature (° C.) |
| PCP-01 | 2.10 | 24.39 | 0.65 | 5.05 | 4.90 | 81.85 | 69.5 |
| PCP-04 | 1.65 | 24.39 | 0.69 | 7.58 | 4.90 | 83.25 | 63.3 |
| PCP-05 | 1.28 | 24.39 | 0.68 | 7.78 | 4.9 | 83.72 | 65.3 |
| PCP-17 | 1.48 | 24.40 | 1.27 | 17.32 | 9.34 | 83.66 | 58.2 |

TABLE A-2

| Polymers | Polymerization rate (kg/hr) | wt % ethylene | wt % ENB | MFR (230° C., 2.16 kg) (g/10 min) |
|---|---|---|---|---|
| PCP-01 | 8.8 | 16.3 | 2.0 | 3.6 |
| PCP-04 | 8.1 | 13.4 | 2.0 | 3.8 |
| PCP-05 | 8.5 | 10.3 | 2.1 | 4.1 |
| PCP-17 | 7.7 | 11.5 | 3.8 | 1.9 |

In certain examples, the PCP was blended with thermoplastic polyolefin, polyolefin elastomer and coagents and the mixing process for the blend with a thermoplastic resin (e.g., thermoplastic polypropylene) was carried out under conditions of high shear at a temperature above the melting point of the thermoplastic. Mixing of the components can be effected by mixing the thermoplastic elastomer components at elevated temperature in conventional mixing equipment such as Banbury mixers, Brabender mixers, continuous mixers, mixing extruders and the like. Blends of PCP thus prepared were compression molded in to 2 mm plaques for physical property evaluation. A certain number of plaques were then crosslinked by exposing the plaques to electron beam radiation for various periods of time at room temperature. The physical properties were evaluated following ISO 878 for Hardness, ISO 37 for ultimate tensile strength (UTS) and ultimate elongation (UE), and ASTM D412 standard guidelines. A xylene solvent extraction test was conducted on the cured samples using a Soxhlet extractor (extraction time=12 hrs) to understand the level of crosslinked material after e-beam curing. Results are expressed as: percent Xylene insoluble=weight after extraction/weight before extraction*100. The physical properties of the plaque samples are given in Table 2.

TABLE 2

Properties of plaque samples

| | Example: | | | | | | | | | | |
|---|---|---|---|---|---|---|---|---|---|---|---|
| | 6 | 7 | 8 | 9 | 10 | 11 | 12 | 13 | 14 | 15 | 16 |
| Properties Before E-beaming | | | | | | | | | | | |
| Specific gravity | 0.876 | 0.860 | 0.877 | 0.864 | 0.862 | 0.875 | 0.864 | 0.866 | 0.863 | 0.868 | 0.871 |
| Hardness, Shore A, 15 s. | 83 | 37 | 84 | 59 | 49 | 83 | 62 | 62 | 44 | 67 | 70 |
| UTS (MPa) | 21.63 | 0.97 | 22.86 | 9.08 | 3.85 | 20.69 | 12.54 | 12.00 | 1.95 | 12.22 | 12.94 |
| Elongation at break, (%) | 795 | 780 | 716 | 789 | 793 | 681 | 756 | 792 | 783 | 769 | 749 |
| 100% Mod. (MPa) | 4.28 | 0.92 | 4.56 | 1.82 | 1.32 | 4.39 | 2.07 | 2.14 | 1.19 | 2.37 | 2.83 |
| Tension Set (%), 23 C. | 8 | 10 | 8 | 3 | 6 | 7 | 3 | 4 | 3 | 4 | 4 |
| Tension Set (%), 70 C. | 43 | 85 | 42 | 53 | 60 | 48 | 48 | 49 | 53 | 48 | 47 |
| MFR (230 C., 2.16 kg) | 21.7 | 15.5 | 3.1 | 3.5 | 3.8 | 0.44 | 0.32 | 3.2 | 15 | 3.4 | 4.7 |
| FTIR - C2% | 11.8 | 18.2 | 11.3 | 16.1 | 18.5 | 12.1 | 15.7 | 15.0 | 17.2 | 14.0 | 13.0 |
| FTIR - diene content, % | 2.42 | 2.37 | 2.51 | 2.39 | 2.37 | 2.34 | 2.51 | 2.32 | 2.28 | 2.21 | 2.02 |
| Properties after E-beaming (5 MRad) | | | | | | | | | | | |
| Sp Gravity (Akron) | 0.877 | 0.856 | 0.875 | 0.864 | 0.862 | 0.875 | 0.865 | 0.866 | 0.858 | 0.869 | 0.870 |
| Hardness, Shore A, 15 s | 82 | 36 | 82 | 59 | 48 | 81 | 60 | 62 | 43 | 67 | 68 |
| UTS (MPa) | 16.28 | 1.61 | 20.37 | 10.31 | 4.64 | 17.94 | 10.83 | 9.25 | 2.82 | 9.72 | 9.23 |
| Elongation at break, (%) | 727 | 783 | 698 | 777 | 790 | 667 | 738 | 714 | 789 | 682 | 599 |
| 100% Mod. (MPa) | 4.32 | 0.87 | 4.53 | 1.78 | 1.17 | 4.38 | 1.86 | 2.08 | 1.06 | 2.30 | 2.70 |
| Tension Set (%), 23 C. | 7 | 6 | 7 | 4 | 4 | 6 | 3 | 3 | 4 | 4 | 3 |
| Tension Set (%), 70 C. | 39 | 27 | 34 | 15 | 17 | 38 | 15 | 18 | 29 | 19 | 20 |
| Xylene soluble, % | 37 | 47 | 21 | 24 | 10 | 19 | 19 | 22 | 48 | 22 | 28 |
| Xylene insoluble, % | 63 | 53 | 79 | 76 | 90 | 81 | 81 | 78 | 52 | 78 | 72 |

| | Example: | | | | | | | | | | |
|---|---|---|---|---|---|---|---|---|---|---|---|
| | 17 | 18 | 19 | 20 | 21 | 22 | 23 | 24 | 25 | 26 | 27 |
| Properties Before E-beaming | | | | | | | | | | | |
| Sp Gravity | 0.873 | 0.876 | 0.873 | 0.868 | 0.869 | 0.869 | 0.871 | 0.866 | 0.879 | 0.869 | 0.872 |
| Hardness, Shore A, 15 s. | 66 | 64 | 68 | 67 | 65 | 68 | 69 | 59 | 83 | 68 | 69 |
| UTS (MPa) | 11.65 | 11.96 | 12.65 | 11.39 | 12.36 | 13.58 | 13.95 | 7.36 | 21.46 | 12.91 | 13.60 |
| Elongation at break, (%) | 771 | 781 | 759 | 752 | 761 | 791 | 785 | 787 | 702 | 725 | 778 |
| 100% Mod. (MPa) | 2.33 | 2.31 | 2.76 | 2.43 | 2.37 | 2.38 | 2.45 | 1.74 | 4.39 | 2.56 | 2.57 |
| Tension Set (%), 23 C. | 5 | 5 | 5 | 5 | 5 | 4 | 4 | 5 | 7 | 3 | 5 |
| Tension Set (%), 70 C. | 48 | 50 | 50 | 50 | 48 | 50 | 50 | 50 | 49 | 45 | 50 |
| MFR (230 C., 2.16 kg) | 4.5 | 4.5 | 3.4 | 3.9 | 3.3 | 3.2 | 4.5 | 3.4 | 1.9 | 0.66 | 3.7 |
| FTIR - C2% | 10.5 | 10.0 | 12.4 | 18.1 | 18.9 | 14.1 | 27.0 | 15.6 | 9.2 | 13.5 | 21.6 |
| FTIR - diene content, % | NA | NA | 1.98 | 2.02 | 2.32 | 2.25 | 2.04 | 2.20 | NA | 2.16 | NA |
| Properties after E-beaming (5 MRads) | | | | | | | | | | | |
| Sp Gravity | 0.874 | 0.877 | 0.873 | 0.868 | 0.869 | 0.869 | 0.871 | 0.868 | 0.880 | 0.869 | 0.874 |
| Hardness, Shore A, 15 s | 67 | 63 | 68 | 62 | 66 | 66 | 69 | 58 | 82 | 68 | 66 |
| UTS (MPa) | 10.46 | 9.93 | 9.79 | 9.98 | 10.47 | 11.78 | 11.50 | 6.71 | 18.57 | 9.41 | 9.66 |
| Elongation at break, (%) | 753 | 750 | 716 | 724 | 690 | 721 | 707 | 669 | 704 | 639 | 787 |
| 100% Mod. (MPa) | 2.30 | 2.12 | 2.41 | 2.32 | 2.19 | 2.39 | 2.48 | 1.71 | 4.25 | 2.51 | 2.41 |
| Tension Set (%), 23 C. | 4 | 4 | 4 | 4 | 3 | 4 | 3 | 4 | 6 | 4 | 4 |
| Tension Set (%), 70 C. | 32 | 29 | 25 | 22 | 20 | 20 | 20 | 21 | 40 | 20 | 37 |
| Xylene soluble, % | 37 | 32 | 26 | 11 | 21 | 24 | 22 | 26 | 28 | 19 | 73 |
| Xylene insoluble, % | 63 | 68 | 74 | 89 | 79 | 76 | 78 | 74 | 72 | 81 | 27 |

TABLE 2-continued

Properties of plaque samples

Example:

| | 28 | 29 | 30 | 31 | 32 | 33 | 34 |
|---|---|---|---|---|---|---|---|
| Properties Before E-beaming | | | | | | | |
| Hardness, Shore A, 15 s. | 57.0 | 53.2 | 52.8 | 52.8 | 52.8 | 55.2 | 55.6 |
| MFR (230 C., 2.16 kg Before E-beaming | 4.2 | 5.3 | 6.2 | 8.9 | 0.83 | 3.9 | 3.8 |
| UTS (MPa) | | | | | | 10.1 | |
| Max Tensile Strength, (MPa) | 11.1 | 9.7 | 9.6 | 9.1 | 10.5 | | 10.8 |
| Elongation at break, (%) | did not break | did not break | did not break | did not break | did not break | 780 | did not break |
| 100% Mod. (MPa) | 1.87 | 1.69 | 1.67 | 1.66 | 1.63 | 1.86 | 1.78 |
| Tension Set (%), 23 C. | 5% | 6% | 5% | 6% | 8% | 6% | 4% |
| Tension Set (%), 70 C. | 51% | 49% | 49% | 49% | 45% | 49% | 48% |
| Properties After E-beaming, 5 MRAD | | | | | | | |
| UTS (MPa), | 8.4 | | | | | 8.7 | 10.9 |
| Max Tensile Strength, (MPa) | | 9.9 | 9.4 | 9.2 | 9.1 | | |
| Elongation at break, (%) | 706 | did not break | did not break | did not break | 525 | 769 | 790 |
| 100% Mod. (MPa) | 1.88 | 1.67 | 1.62 | 1.54 | 2.18 | 1.81 | 1.78 |
| Tension Set (%), 23 C. (Akron) | 5% | 4% | 4% | 9% | 5% | 5% | 4% |
| Tension Set (%), 70 C. | 29% | 38% | 39% | 39% | 19% | 35% | 32% |
| Xylene Extraction, % solubles | 33 | 61 | 61 | 60 | 17 | 50 | 37 |
| Xylene Extraction, % insolubles | 67 | 39 | 39 | 40 | 83 | 50 | 63 |

Example:

| | 35 | 36 | 37 | 38 | 39 | 40 | 41 | 42 |
|---|---|---|---|---|---|---|---|---|
| Before e-beaming | | | | | | | | |
| Hardness, Shore A, 15 s. | 55.6 | 58.0 | 54.0 | 57.4 | 61.0 | 54.2 | 53.8 | 65 |
| MFR, g/10 min (230 C., 2.16 kg) | 4.5 | 3.7 | 6.6 | 4.03 | 6.5 | 6.1 | 4.4 | 4.6 |
| UTS (MPa) | | | | | | | | |
| Max Tensile Strength, (MPa) | 10.7 | 10.9 | 9.1 | 10.9 | 9.7 | 9.2 | 9.0 | 12.68 |
| Elongation at break, (%) | did not break | did not break | did not break | did not break | did not break | did not break | did not break | 790 |
| 100% Mod. (MPa) | 1.84 | 1.82 | 1.61 | 1.87 | 1.77 | 1.65 | 1.61 | 2.41 |
| Tension Set (%), 23 C. | 6% | 6% | 6% | 5% | 5% | 6% | 8% | 6 |
| Tension Set (%), 70 C. | 49% | 49% | 49% | 49% | 46% | 47% | 46% | 47 |
| After E-beaming, 5 MRAD | | | | | | | | |
| UTS (MPa), | 11.3 | 10.4 | 9.1 | 9.6 | 9.9 | | 8.2 | NA |
| Max Tensile Strength, (MPa) | | | | | | 10.2 | | |
| Elongation at break, (%) | 785 | 781 | 868 | 733 | 876 | did not break | 954 | NA |
| 100% Mod. (MPa) | 1.8 | 1.82 | 1.5 | 1.87 | 1.55 | 1.64 | 1.6 | NA |
| Tension Set (%), 23 C. | 5% | 5% | 4% | 4% | 5% | 5% | 5% | NA |
| Tension Set (%), 70 C. | 31% | 30% | 39% | 29% | 39% | 40% | 40% | NA |
| Xylene Extraction, % solubles | 34 | 34 | 53 | 27 | 52 | 52 | 68 | NA |
| Xylene Extraction, % insolubles | 66 | 66 | 47 | 73 | 48 | 48 | 32 | NA |

The selected PCP polymers and blends (Ex 1-5, 8, 15, 17, 23, 25, & 42) were extruded using a 38.1 mm (1½") Davis Standard single screw extruder. In examples 8, 15, & 42 pellets, were dry blended with a Kemamide masterbatch of VM 6100 with Erucamide at 40% concentration and a siloxane grafted LDPE (Lubotene RLF 4009) at 2 wt % level. The extruder settings and extruder conditions for examples 1-5 are shown in Table 3.

TABLE 3

Extruder settings and extrusion conditions:

| | EXAMPLE | | | | |
|---|---|---|---|---|---|
| | 1 | 2 | 3 | 4 | 5 |
| Extruder Settings/Conditions | | | | | |
| Zone 1 (° C.) | 188 | 185 | 221 | 221 | 216 |
| Zone 2 (° C.) | 193 | 191 | 224 | 227 | 218 |
| Zone 3 (° C.) | 199 | 196 | 224 | 232 | 218 |
| Zone 4 (° C.) | 204 | 202 | 227 | 238 | 221 |
| Die 1 (° C.) | 210 | 207 | 227 | 238 | 227 |
| Die 2 (° C.) | 216 | 213 | 232 | 243 | 227 |
| Melt temperature (° C.) | 239 | 241 | 251 | 251 | 251 |
| Pressure (bar) | 22.6 | 32.6 | 26.9 | 35.7 | 27.9 |
| Amps (A) | 2.9 | 3.1 | 2.6 | 3.7 | 2.7 |
| RPM's | 37 | 37 | 37 | 37 | 37 |
| Screen | None | None | None | None | None |
| Die & Pin: 12.7 mm die, 8.9 mm pin | | | | | |
| Conveyor Speed (m/min) | 5.0 | 5.1 | 4.8 | 6.2 | 4.9 |

The extruded tubes were then crosslinked by exposing the tubes to electron beam radiation for various periods of time at room temperature. The selected dosages were 5, 7.5 and 15 Mrad. The mechanical properties (ultimate tensile strength (UTS), ultimate elongation (UE) and toughness) were measured on microtensile bars cut out of the tubing and were measured according to ASTM D1708-06. Table 4 summarizes the mechanical properties of the uncured tubes and Table 5 summarizes the mechanical properties of the tubes after exposure to e-beam irradiation.

TABLE 4

Mechanical properties of the uncured tubing

| EX: | Hardness Shore A | UTS MPa | UE % | Toughness J/m3 |
|---|---|---|---|---|
| 1 | 66 | 15.0 | 1292 | 515 |
| 2 | 66 | 17.6 | 1288 | 449 |
| 3 | 74 | 18.6 | 1203 | 814 |
| 4 | 80 | 18.6 | 1091 | 655 |
| 5 | 68 | 17.4 | 1163 | 442 |

| Ex. | UTS, MPa | M100, MPa | UE, % |
|---|---|---|---|
| 8 | 11.7 | 3.5 | 741 |
| 8-KE | 13.8 | 3.2 | 898 |
| 8-LB | 12.46 | 3.4 | 832 |
| 15 | 10.3 | 2.4 | 930 |
| 15-KE | 10.9 | 2.5 | 1032 |
| 15-LB | 10.1 | 2.8 | 928 |
| 17 | 10.9 | 2.6 | 947 |
| 23 | 10.5 | 2.5 | 887 |
| 42 | 10.9 | 2.6 | 1007 |
| 42-KE | 11.1 | 2.5 | 1082 |
| 42-LB | 10.1 | 2.5 | 997 |
| 25 | 12.6 | 3.8 | 731 |

TABLE 5

Mechanical properties of the cured tubing

| | 5 Mrad | | | 7.5 Mrad | | | 15 Mrad | | |
|---|---|---|---|---|---|---|---|---|---|
| EX: | UTS MPa | UE % | Toughness J/m³ | UTS MPa | UE % | Toughness J/m³ | UTS MPa | UE % | Toughness J/m³ |
| 1 | 14.0 | 1372 | 562 | 13.5 | 1206 | 468 | 12.0 | 1043 | 402 |
| 2 | 15.4 | 1305 | 333 | 16.2 | 1283 | 372 | 14.1 | 1155 | 299 |
| 3 | 18.0 | 1281 | 676 | 19.5 | 1223 | 694 | 17.2 | 1052 | 608 |
| 4 | 17.1 | 1204 | 612 | 18.8 | 1143 | 541 | 18.7 | 1047 | 568 |
| 5 | 15.6 | 1173 | 351 | 17.0 | 1132 | 230 | 15.2 | 1013 | 212 |

| | 5 Mrad | | | | 7.5 Mrad | | | 10 Mrad | | | |
|---|---|---|---|---|---|---|---|---|---|---|---|
| Ex. | UTS, MPa | M100, MPa | UE, % | Xylene insol., % | UTS, MPa | M100, MPa | UE, % | UTS, MPa | M100, MPa | UE, % | Xylene insol., % |
| 8 | 13.2 | 3.7 | 814 | 87 | 12.9 | 3.7 | 770 | 11.1 | 3.4 | 686 | 90 |
| 8-KE | 14.5 | 3.7 | 904 | 82 | 13.5 | 3.7 | 841 | | | | |
| 8-LB | 13.7 | 3.6 | 830 | NA | 11 | 3.4 | 697 | | | | |
| 15 | 10 | 2.6 | 822 | 84 | 9.2 | 2.7 | 738 | 8.3 | 2.4 | 681 | 88 |
| 15-KE | 8.2 | 2.4 | 813 | 79 | 10.5 | 2.5 | 911 | | | | |
| 15-LB | 10.4 | 2.8 | 884 | 83 | 9.5 | 2.7 | 813 | | | | |
| 17 | 10.1 | 2.8 | 881 | 77 | 10.5 | 2.6 | 879 | | | | |
| 23 | 10.7 | 2.6 | 804 | 83 | 11.6 | 2.5 | 830 | | | | |
| 42 | 8.9 | 2.5 | 808 | 82 | 9.7 | 2.6 | 814 | 8.5 | 2.4 | 771 | 86 |
| 42-KE | 11.1 | 2.6 | 965 | 78 | 9.4 | 2.8 | 814 | 10.6 | 2.7 | 896 | 82 |
| 42-LB | 10.3 | 2.7 | 916 | 81 | 10.4 | 2.8 | 871 | | | | |
| 25 | 11.6 | 3.7 | 695 | 79 | 14.5 | 3.9 | 864 | | | | |

Haze was measured on the cured and uncured tubing samples. The tube samples were cut into samples of 1.5-2.0 inches (3.8-5.1 cm) in length and split along the entire length thereof in the longitudinal axis. The haze of split ("opened") tubes was then measured with a BYK-Gardner Hazeguard Plus hazemeter according to ASTM D1003-00. The results are shown in Table 6:

TABLE 6

Haze Measurements on Tubing Samples

| Example | Uncured Avg Thickness (mil) | Uncured Haze (%) | 5 Mrad Avg Thickness (mm) | 5 Mrad Haze (%) | 7.5 Mrad Avg Thickness (mm) | 7.5 Mrad Haze (%) | 15 Mrad Avg Thickness (mm) | 15 Mrad Haze (%) |
|---|---|---|---|---|---|---|---|---|
| 1 | 1.2 | 24.6 | 1.1 | 24.9 | 1.2 | 19.5 | 1.1 | 23.2 |
| 2 | 1.2 | 38.2 | 1.2 | 31.5 | 1.3 | 38.1 | 1.4 | 40.8 |
| 3 | 1.3 | 30.2 | 1.3 | 32.4 | 1.3 | 29.4 | 1.3 | 32.3 |
| 4 | 1.2 | 36.3 | 1.3 | 37.3 | 1.3 | 35.3 | 1.4 | 36.5 |
| 5 | 1.0 | 22.9 | 1.1 | 15.4 | 1.0 | 16.9 | 1.1 | 19.5 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for extruding a transparent or translucent tubing used for medical or food contact applications, comprising:
    providing from 90 to 100%, based on the weight of the tubing, of a propylene-based polymer comprising propylene derived units and one or more dienes, the propylene-based polymer having a triad tacticity of from 50% to 99% and a heat of fusion of less than 80 J/g, and wherein the propylene-based polymer comprises from 5 to 25 wt %, by weight of the polymer, of $C_2$ and/or a $C_4$-$C_{20}$ olefin units;
    extruding the propylene-based polymer in the absence of processing oil into tubing; and then
    crosslinking the extruded tubing via electron-beam irradiation at least 5 Mrad, wherein the extruded tubing has a haze value of about 40% or less, and has a xylenes insoluble level of 76% to 90%.

2. The method of claim 1, wherein the propylene-based polymer has a melting point of about 100° C. or less.

3. The method of claim 1, wherein the propylene-based polymer has a heat of fusion from about 1 J/g to about 70 J/g.

4. The method of claim 1, wherein the propylene-based polymer has a triad tacticity from about 60% to about 97%.

5. The method of claim 1, wherein the propylene-based polymer further comprises units derived from an alpha-olefin other than the propylene derived units and/or the one or more dienes.

6. The method of claim 5, wherein the propylene-based polymer further comprises units derived from ethylene, butene, hexene and/or octene.

7. The method of claim 1, wherein the propylene-based polymer comprises from 0.5 to 4 wt % of 5-ethylidene-2-norbornene (ENB).

8. The method of claim 1, further comprising blending the propylene-based polymer with an ethylene-propylene copolymer and/or an ethylene-propylene-diene terpolymer prior to extrusion.

9. The method of claim 1, further comprising blending the propylene-based polymer with a co-agent prior to extrusion.

10. The method of claim 8, further comprising blending the propylene-based polymer with a co-agent prior to extrusion.

11. The method of claim 1, wherein the tubing has a haze value of about 30% or less.

12. The method of claim 1, wherein the tubing has a haze value of about 20% or less.

13. A method for extruding transparent or translucent tubing used for medical or food contact applications, comprising:
    blending from 90 to 100%, based on the weight of the tubing, of a propylene-based polymer comprising propylene derived units and one or more dienes, the propylene-based polymer having a triad tacticity of from 50% to 99% and a heat of fusion of less than 80 J/g; and one or more polyolefinic thermoplastic components to provide a blend, wherein the blend contains no processing oil; and wherein the propylene-based polymer comprises from 5 to 25 wt %, by weight of the polymer, of $C_2$ and/or a $C_4$-$C_{20}$ olefin units;
    extruding the blend in the absence of processing oil into tubing; and then
    crosslinking the extruded tubing via electron-beam irradiation at least 5 Mrad, wherein the extruded tubing has a haze value of about 40% or less, and has a xylenes insoluble level of 76% to 90%.

14. The method of claim 13, wherein the one or more polyolefinic thermoplastic components are selected from the group consisting of isotactic polypropylene, random copolymer, and impact copolymer.

15. The method of claim 13, wherein the blend further comprises an ethylene-propylene copolymer and/or an ethylene-propylene-diene terpolymer.

16. The method of claim 13, wherein the blend further comprises a co-agent.

17. The method of claim 13, wherein the extruded tubing has a haze value of about 30% or less.

18. The method of claim 13, wherein the extruded tubing has a haze value of about 20% or less.

* * * * *